(12) United States Patent
Wang et al.

(10) Patent No.: US 9,783,662 B2
(45) Date of Patent: Oct. 10, 2017

(54) POLYETHYLENE COMPOSITION SUITABLE FOR INJECTION MOULDING APPLICATIONS

(71) Applicants: Abu Dhabi Polymers Co. LTD (Borouge) L.L.C., Abu Dhabi (AE); Borealis AG, Vienna (AT)

(72) Inventors: Cindy Xin Wang, Beijing (CN); Tanja Piel, Linz (AT); Antti Tynys, Abu Dhabi (AE)

(73) Assignees: ABU DHABI POLYMERS CO. LTD (BOROUGE) L.L.C., Abu Dhabi (AE); BOREALIS AG, Vienna (AT)

( * ) Notice: Subject to any disclaimer, the term of this patent is extended or adjusted under 35 U.S.C. 154(b) by 0 days.

(21) Appl. No.: 15/021,136

(22) PCT Filed: Oct. 30, 2013

(86) PCT No.: PCT/CN2013/001310
§ 371 (c)(1),
(2) Date: Mar. 10, 2016

(87) PCT Pub. No.: WO2015/061922
PCT Pub. Date: May 7, 2015

(65) Prior Publication Data
US 2016/0229993 A1    Aug. 11, 2016

(51) Int. Cl.
*C08L 23/06* (2006.01)
*C08F 210/16* (2006.01)
*C08L 23/08* (2006.01)
*F16L 9/12* (2006.01)

(52) U.S. Cl.
CPC ............ *C08L 23/06* (2013.01); *C08F 210/16* (2013.01); *C08L 23/0815* (2013.01); *C08L 2203/18* (2013.01); *C08L 2205/025* (2013.01); *C08L 2314/02* (2013.01); *F16L 9/12* (2013.01)

(58) Field of Classification Search
CPC . C08L 23/06; C08L 2314/02; C08L 2205/025
See application file for complete search history.

(56) References Cited

U.S. PATENT DOCUMENTS

| | | |
|---|---|---|
| 3,324,093 A | 6/1967 | Alleman |
| 3,405,109 A | 10/1968 | Rohlfing |
| 4,532,311 A | 7/1985 | Fulks et al. |
| 4,582,816 A | 4/1986 | Miro |
| 4,803,251 A | 2/1989 | Goode et al. |
| 4,855,370 A | 8/1989 | Chirillo et al. |
| 5,026,795 A | 6/1991 | Hogan |
| 5,391,654 A | 2/1995 | Ahvenainen et al. |

FOREIGN PATENT DOCUMENTS

| | | |
|---|---|---|
| EP | 0 479 186 A2 | 4/1992 |
| EP | 0 560 035 A1 | 9/1993 |
| EP | 0 810 235 A2 | 12/1997 |
| EP | 1 655 335 A1 | 5/2006 |
| WO | WO 2004/055068 A1 | 7/2004 |
| WO | WO 2004/055069 A1 | 7/2004 |
| WO | WO 2006/048255 A1 | 5/2006 |
| WO | WO 2006/048260 A1 * | 5/2006 .............. C08L 23/06 |

OTHER PUBLICATIONS

Busico et al.; Alk-1-ene Polymerization in the Presence of a Monocyclopentadienyl Zirconium (IV) Acetamidinate Catalyst: Microstructural and Mechanistic Insights; 28; 1128-1134; 2007.
Castignolles et al.; Detection and quantification of branching in polyacrylates by size exclusion chromatography (SEC) and melt-state 13C NMR spectroscopy; Polymer; 50; 2373-2383; 2009.
Filip et al.; Heteronuclear decoupling under fast MAS by a rotor-synchronized Hahn-echo pulse train; Journal of Magnetic Resonance; 176; 239-243; 2005.
Griffin et al.; Low-load rotor-synchronised Hahn-echo pulse train (RS-HEPT) 1 H decoupling in solid-state NMR: factors affecting MAS spin-echo dephasing times; Mag. Reson. Chem.; 45; S198-S208; 2007.
Klimke et al.; Optimisation and Application of Polyolefin Branch Quantification by Melt State 13C NMR Spectroscopy; Macromolecular Chemistry and Physics; 207; 382-295; 2006.
Parkinson et al.; Effect of Branch Length on 13C NMR Relaxation Properties in Molten Poly[ethylene-co-(a-olefin)] Model Systems; Macromolecular Chemistry and Physics; 208; 2128-2133; 2007.

(Continued)

*Primary Examiner* — Robert Harlan
(74) *Attorney, Agent, or Firm* — Richard M. Klein; Fay Sharpe LLP

(57) ABSTRACT

The present invention relates to a polyethylene composition comprising—a base resin comprising (A) a first ethylene homo- or copolymer component having a melt flow rate MFR2 (2.16 kg, 190° C.) of equal to or more than 150 g/10 min to equal to or less than 300 g/10 min, determined according to ISO 1133, and (B) a second ethylene homo- or copolymer component, —optional carbon black, —optional further polymer component(s) different to the first ethylene homo- or copolymer components (A) and (B), and —optional additive(s); wherein the first ethylene homo- or copolymer component (A) has a lower weight average molecular weight as the second ethylene homo- or copolymer component (B), and the weight ratio of the first ethylene homo- or copolymer component (A) to the second ethylene homo- or copolymer component (B) is from 40:60 to 47:53; the polyethylene composition has a melt flow rate MFR5 (5 kg, 190° C.) of equal to or more than 0.35 g/10 min to equal to or less than 0.60 g/10 min, determined according to ISO 1133. The invention further relates to a process for the production of such a polyethylene composition, an article, such as a pipe or pipe fitting comprising such a polyethylene composition and the use of such a polyethylene composition for the production of such an article.

21 Claims, No Drawings

(56) References Cited

OTHER PUBLICATIONS

Pollard et al.; Observation of Chain Branching in Polyethylene in the Solid State and Melt via 13C NMR Spectroscopy and Mel NMR Relaxation Time Measurements; Macromolecules; 37; 813-825; 2004.
Randall et al.; A Review of High Resolution Liquid 13Carbon Nuclear Magnetic Resonance Characterizations of Ethylene-Based Polymers; Journal of Macromolecular Science, Part C: Polymer Reviews; vol. 29; No. 2-3; 1989.
Zhou et al.; A new decoupling method for accurate quantification of polyethylene copolymer composition and triad sequence distribution with 13C NMR; Journal of Magnetic Resonance; 187; 225-233; 2007.
International Search Report of International Application No. PCT/CN2013/001310 dated Jul. 23, 2014.

* cited by examiner

POLYETHYLENE COMPOSITION SUITABLE FOR INJECTION MOULDING APPLICATIONS

The present invention relates to a polyethylene composition, particularly a polyethylene composition for injection moulding applications such as pipe and especially pipe fitting applications. The invention further relates to a process for the production of said polyethylene composition.

BACKGROUND OF THE INVENTION

Numerous polyethylene compositions for the production of pipe are known. Pipe materials are classified such as PE80 or PE100. The service temperature for PE100 is 20° C. The ISO9080 classification guarantees that a PE100 material will have a lifetime of at least 50 years at 20° C. using internal stress of 10 MPa.

For many applications, it is necessary to connect different pipe segments by fittings specially adapted to the diameter of each pipe segment. In contrast to pipes, these fittings may have a complex three-dimensional structure, e.g. a T-shaped, cross-shaped or bent structure. However, fittings can also be prepared in the form of pipes of constant or varying diameter. For preparing polymeric articles having a complex three-dimensional structure, injection moulding is preferred to extrusion since it is a cost-effective means for producing these articles at high production rate. However, injection moulding requires rheological properties specifically adapted to this method, whereas the final articles should still have excellent mechanical properties, i.e. mechanical properties still meeting the PE80 or PE100 quality standards established for pipes. This is particularly true for pipe fittings, since the same long-term internal pressure does not only put a strain on the pipe, but also on the fittings connecting these pipes. Thus, quite often a polymer suitable for extrusion cannot be used for injection moulding, either due to its inappropriate rheological properties or due to insufficient mechanical properties of the resultant product.

Injection moulding is a repetitive process in which a polymeric material is melted and injected into a mould cavity where the article is cooled down. In the injection moulding process, filling of the mould and solidification partially take place at the same time. However, instant cooling generates internal stress, thereby increasing the risk of stress cracking. Thus, the polymeric melt must have sufficient flowability to fill the complete cavity before solidification takes place. Furthermore, if rheological properties are not carefully fine-tuned, the resultant moulded articles will have surface defects, e.g. stripes or wave patterns. Desired surface properties are shininess as well as a surface free from flow marks.

The step of filling the mould cavity is normally followed by a packing step, wherein a packing pressure is applied to ensure complete filling. After solidification, the mould opens and the article is ejected. However, another problem typically arising from injection moulding processes is shrinkage of the resultant article. Especially for fittings which are specially adapted to the size of other articles like pipes, very low shrinkage is of crucial importance.

EP 1 655 335 discloses a polyethylene composition with improved rheological and shrinkage behavior which is suitable for injection moulding applications, and especially suitable for fittings. However, the mechanical properties such as pressure resistance still need to be improved.

There is still a need for polyethylene compositions suitable for injection moulding applications, which show improved mechanical properties such as slow crack growth resistance and rapid crack propagation resistance, which are especially necessary for the production of pipe fittings.

SUMMARY OF THE INVENTION

The present invention is based on the surprising finding that polyethylene pipes and especially pipe fittings with improved mechanical properties such as slow crack growth resistance and rapid crack propagation resistance, can be provided if made from a polyethylene composition comprising a base resin comprising, preferably consisting of
(A) a first ethylene homo- or copolymer component having a melt flow rate $MFR_2$ (2.16 kg, 190° C.) of equal to or more than 150 g/10 min to equal to or less than 300 g/10 min, determined according to ISO 1133, and
(B) a second ethylene homo- or copolymer component,
optional carbon black,
optional further polymer components and
optional further additive(s).
wherein the first ethylene homo- or copolymer component (A) has a lower weight average molecular weight as the second ethylene homo- or copolymer component (B), and the weight ratio of the first ethylene homo- or copolymer component (A) to the second ethylene homo- or copolymer component (B) is from 40:60 to 47:53;
the polyethylene composition has a melt flow rate $MFR_5$ (5 kg, 190° C.) of equal to or more than 0.35 g/10 min to equal to or less than 0.60 g/10 min, determined according to ISO 1133.

The polyethylene compositions of the present invention surprisingly not only show suitable rheological and shrinkage properties but also improved mechanical properties such as slow crack growth resistance in the notched pipe test and the pressure resistance test and rapid crack propagation resistance like Charpy Notched Impact resistance and in the S4-Test.

The present invention therefore provides
a polyethylene composition comprising
a base resin comprising
(A) a first ethylene homo- or copolymer component having a melt flow rate $MFR_2$ (2.16 kg, 190° C.) of equal to or more than 150 g/10 min to equal to or less than 300 g/10 min, determined according to ISO 1133, and
(B) a second ethylene homo- or copolymer component,
optional carbon black,
optional further polymer component(s) different to the first ethylene homo- or copolymer components (A) and (B), and
optional further additive(s).
wherein the first ethylene homo- or copolymer component (A) has a lower weight average molecular weight as the second ethylene homo- or copolymer component (B), and the weight ratio of the first ethylene homo- or copolymer component (A) to the second ethylene homo- or copolymer component (B) is from 40:60 to 47:53;
the polyethylene composition has a melt flow rate $MFR_5$ (5 kg, 190° C.) of equal to or more than 0.35 g/10 min to equal to or less than 0.60 g/10 min, determined according to ISO 1133.

The present invention further provides a polyethylene composition obtainable by a multistage process, the multistage process comprising a) polymerizing ethylene in the presence of a Ziegler-Natta catalyst for obtaining an intermediate material, the intermediate material having a melt flow rate $MFR_2$ (2.16 kg, 190° C.) of equal to or more than 150 g/10 min to equal to or less than 300 g/10 min, determined according to ISO 1133,
b) transferring the intermediate material to a gas phase reactor
   (i) feeding ethylene and at least one alpha-olefin comonomer having from 3 to 12 carbon atoms to the gas phase reactor
   (ii) further polymerizing the intermediate material to obtain a base resin which comprises the intermediate material in an amount of 40 to 47 wt % of the base resin,
c) extruding the base resin, optionally in the presence of carbon black and/or further additive(s), into a polyethylene composition having a melt flow rate $MFR_5$ (5 kg, 190° C.) of equal to or more than 0.35 g/10 min to equal to or less than 0.60 g/10 min, determined according to ISO 1133.

In a further aspect, the present invention provides an article comprising the polyethylene composition according to the present invention.

In yet a further aspect, the present invention is concerned with the use of the inventive polyethylene composition for the production of an article.

Thereby, it is preferred that the article relates to a pipe or a pipe fitting.

Definitions

A polyethylene composition according to the present invention denotes a polymer derived from at least 50 mol-% ethylene monomer units and additional comonomer units.

An ethylene homopolymer thereby denotes a polymer consisting essentially of ethylene monomer units. Due to the requirements of large-scale polymerization it may be possible that the ethylene homopolymer includes minor amounts of comonomer units, which usually is below 0.1 mol %, preferably below 0.05 mol %, most preferably below 0.01 mol % of the ethylene homopolymer.

The term 'base resin' denotes the polymeric component of the composition.

The term 'different' denotes that a polymeric component differs from another polymeric component in at least one measureable property. Suitable properties for differentiating polymeric components are weight average molecular weight, melt flow rate $MFR_2$ or $MFR_5$, density or comonomer content.

General
Base Resin

The base resin comprises a first ethylene homo- or copolymer component (A) and a second ethylene homo- or copolymer component (B).

In one embodiment of the present invention the base resin consists of the first ethylene homo- or copolymer component (A) and the second ethylene homo- or copolymer component (B).

In another embodiment of the present invention the base resin may further comprise further polymer component(s) different to the first ethylene homo- or copolymer components (A) and (B). The further polymer component(s) can be introduced to the base resin or the polyethylene composition either by melt mixing or compounding or in an additional reaction stage of the multi-stage process for producing base resin of the polyethylene composition.

Components (A) and (B) differ in their weight average molecular weight in that that component (B) has a higher weight average molecular weight as component (A). The differences in weight average molecular weight can be seen from the melt flow rate $MFR_2$ of component (A) which is higher than the melt flow rate $MFR_5$ of the polyethylene composition.

The $MFR_2$ (2.16 kg, 190° C.) of component (A) is equal to or more than 150 g/10 min, preferably equal to or more than 165 g/10 min, most preferably equal to or more than 170 g/10 min.

Further, the $MFR_2$ (2.16 kg, 190° C.) of component (A) is equal to or less than 300 g/10 min, preferably equal to or less than 275 g/10 min, more preferably equal to or less than 250 g/10 min and most preferably equal to or less than 230 g/10 min.

Component (A) can be a copolymer of ethylene with one or more alpha-olefins having from 3 to 12 carbon atoms. Preferably the alpha olefin comonomers are selected from alpha olefins having from 4 to 8 carbon atoms, such as 1-butene, 1-hexene, 4-methyl-1-pentene and 1-octene. Especially preferred are 1-butene and 1-hexene.

However, it is preferred that component (A) is an ethylene homopolymer. The homopolymer preferably has a density of at least 970 kg/m$^3$ and preferably of more than 970 kg/m$^2$.

Further, component (A) is preferably present in the base resin in an amount of 40 to 47 wt.-%, more preferably 42 to 47 wt. %, and most preferably 42 to 46 wt.-% with respect to the base resin.

Component (B) is preferably a copolymer of ethylene and at least one alpha-olefin comonomer units with 3 to 12 carbon atoms. Preferably the alpha olefin comonomers are selected from alpha olefins having from 4 to 8 carbon atoms, such as 1-butene, 1-hexene, 4-methyl-1-pentene and 1-octene. Especially preferred are 1-butene and 1-hexene and most preferred is 1-hexene.

Component (B) may further comprise further comonomer units different from alpha olefin comonomers such as dienes, polar comononers or silicon containing comonomers. It is, however, preferred that the component (B) only contains alpha olefin monomers as comonomer units.

It is especially preferred that the component (B) contains either 1-butene or 1-hexene as comonomer units. Mostly preferred is 1-hexene as comonomer unit for component (B).

The content of units derived from at least one alpha olefin comonomer having from 3 to 12 carbon atoms in fraction (B) is preferably 0.4 to 5.5 mol %, more preferably 0.5 to 5.0 mol %, still more preferably 0.5 to 4.0 mol %, most preferably 0.6 to 3.5 mol %.

Further, component (B) is preferably present in the base resin in an amount of 60 to 53 wt.-%, more preferably 58 to 53 wt. %, and most preferably 58 to 54 wt.-% with respect to the base resin.

The weight ratio of the first ethylene homo- or copolymer component (A) to the second ethylene homo- or copolymer component (B) is from 40:60 to 47:53, preferably from 42:58 to 47:53, most preferably from 42:58 to 46:54.

Optionally, the base resin further comprises a prepolymer fraction. The prepolymer fraction preferably is an ethylene homopolymer. The prepolymer fraction is preferably present in an amount of 0 to 5 wt.-%, more preferably in an amount of 0.2 to 3.5 wt.-% and most preferably in an amount of 0.5 to 2.5 wt.-%.

As regards the amount of the different polyethylene components (A) and (B) in the base resin and the weight ratios of components (A) and (B) the optional prepolymer fraction is counted to the amount and the weight of component (A).

In one embodiment of the present invention the base resin consists only of above defined fractions (A) and (B).

In another embodiment of the present invention the base resin consists of fractions (A) and (B) and a prepolymer fraction as defined above.

The latter embodiment is preferred to the former embodiment.

The base resin preferably has a density of equal to or more than 943 kg/m$^3$, more preferably of equal to or more than 945 kg/m$^3$, and most preferably of equal to or more than 946 kg/m$^3$.

Further, the base resin preferably has a density of equal to or less than 952 kg/m$^3$, more preferably of equal to or less than 951 kg/m$^3$, and most preferably of equal to or less than 950 kg/m$^3$.

The base resin according to the present invention preferably is a copolymer of ethylene with at least one alpha olefin comonomer having from 3 to 12 carbon atoms. Preferably the alpha olefin comonomers are selected from alpha olefins having from 4 to 8 carbon atoms, such as 1-butene, 1-hexene, 4-methyl-1-pentene and 1-octene. Especially preferred are 1-butene and 1-hexene. Mostly preferred is 1-hexene.

The ethylene copolymer may further comprise further comonomer units different from alpha olefin comonomers such as dienes, polar comonomers or silicon containing comonomers. It is, however, preferred that the ethylene copolymer only contains alpha olefin monomers as comonomer units.

The content of units derived from at least one alpha olefin comonomer having from 3 to 12 carbon atoms in the base resin is preferably 0.25 to 2.5 mol %, more preferably 0.30 to 2.3 mol %, still more preferably 0.35 to 2.0 mol %, most preferably 0.45 to 1.5 mol %.

Polyethylene Composition

In addition to the base resin, the polymer composition may comprise and preferably comprises usual additives for utilization with polyolefins, such as pigments (e.g. carbon black), stabilizers (e.g. antioxidant agents), antacids and/or anti-UV's, antistatic agents and utilization agents (such as processing aid agents). Preferably, the amount of these additives is 10 wt % or below, more preferably 8 wt % or below, most preferably 5 wt % or below, of the composition (100 wt %).

Preferably, the polyethylene composition preferably comprises carbon black in an amount of 1.0 to 8.0 wt %, preferably 1.5 to 6.0 wt %, more preferably in an amount of 1.7 to 4.0 wt %, even more preferably 1.8 to 3.5 wt %, of the composition (100 wt %).

Further preferred, the amount of additives different from carbon black is 0 wt % to 1 wt %, more preferably 0.001 wt % to 0.5 wt %.

Part or all of the optional additives and or carbon black may be incorporated to the base resin by the base resin producer during the production of base resin, e.g. during the pelletizing step of the base resin powder obtained from the polymerization reactor or by the article producer during the compounding step of the polymer composition.

The polyethylene composition according to the present invention has a melt flow rate MFR$_5$ (190° C., 5 kg) of equal to or more than 0.35 g/10 min, preferably equal to or more than 0.38 g/10 min, more preferably equal to or more than 0.40 g/10 min and most preferably equal to or more than 0.42 g/10 min.

Further, the polyethylene composition has a melt flow rate MFR$_5$ (190° C., 5 kg) of equal to or less than 0.60 g/10 min, preferably equal to or less than 0.58 g/10 min, and most preferably equal to or less than 0.57 g/10 min.

The polyethylene composition according to the present invention preferably has a melt flow rate MFR$_{21}$ (190° C., 21.6 kg) of equal to or more than 8.0 g/10 min, more preferably equal to or more than 9.5 g/10 min, still more preferably equal to or more than 10.5 g/10 min and most preferably equal to or more than 11.0 g/10 min.

Further, the polyethylene composition preferably has a melt flow rate MFR$_{21}$ (190° C., 21.6 kg) of equal to or less than 15.5 g/10 min, preferably equal to or less than 14.0 g/10 min, and most preferably equal to or less than 13.0 g/10 min.

The polyethylene composition preferably has a flow rate ratio, being the ratio of MFR$_{21}$ to MFR$_5$, of equal to or more than 20, more preferably equal to or more than 23, most preferably equal to or more than 25.

Further, the composition preferably has a flow rate ratio of equal to or more than 30, more preferably equal to or more than 28, most preferably equal to or more than 27.

The MFR$_5$ (190° C., 5 kg) and the MFR$_{21}$ (190° C., 21.6 kg) are determined according to ISO 1133.

The polyethylene composition according to the present invention preferably comprises carbon black in the above given amounts and has a density of equal to or more than 955.0 kg/m$^3$ and equal to and less than 965.0 kg/m$^3$, preferably of equal to or more than 956.0 kg/m$^3$ and equal to or less than 963.0 kg/m$^3$, determined according to ISO 1183-1:2004.

The polyethylene composition according to the present invention preferably has a Charpy notched impact strength, determined according to ISO 179eA at a temperature of −20° C., of more than 8.0 kJ/m$^3$, preferably of at least 8.5 kJ/m$^3$, more preferably of at least 9.0 kJ/m$^3$, and most preferably of at least 9.3 kJ/m$^3$. The upper limit of the Charpy notched impact strength is usually not higher than 30 kJ/m$^3$.

The polyethylene composition preferably consists of the base resin as the polymer component(s), carbon black and, optionally, and preferably, additive(s). It is to be understood that preferable carbon black and optional additive(s) may be added to the polymer composition in form of a masterbatch, i.e. together with a carrier polymer. In such case the carrier polymer is not considered as polymer component(s), but is calculated to the amount of carbon black or, respectively, additive(s).

In a further aspect, the present invention is concerned with a polyethylene composition obtainable by a multistage process, the multistage process comprising a) polymerizing ethylene in the presence of a Ziegler-Natta catalyst for obtaining an intermediate material, the intermediate material having a melt flow rate MFR$_2$ (2.16 kg, 190° C.) of equal to or more than 150 g/10 min to equal to or less than 300 g/10 min, determined according to ISO 1133, b) transferring the intermediate material to a gas phase reactor
  (i) feeding ethylene and at least one alpha-olefin comonomer having from 3 to 12 carbon atoms to the gas phase reactor
  (ii) further polymerizing the intermediate material to obtain a base resin which comprises the intermediate material in an amount of 40 to 47 wt % of the base resin, c) extruding the base resin, optionally in the presence of carbon black, and/or further additive(s) into a polyethylene composition having a melt flow rate MFR$_5$ (5 kg, 190° C.) of equal to or more than 0.35 g/10 min to equal to or less than 0.60 g/10 min, determined according to ISO 1133.

The base resin and the polyethylene composition obtainable by the above described multistage process are preferably further defined by the properties of the base resin and the polyethylene composition described above.

Article

In yet a further aspect, the present invention is concerned with an article comprising, preferably consisting of, the polyethylene composition as described above or below in claims.

Thereby, in the preferred embodiment of the present invention the article is a pipe or a pipe fitting comprising, preferably consisting of, the polyethylene composition as described above or below in claims.

The pipe preferably has a pressure resistance of at least 50 h, more preferably of at least 100 h, still more preferably of at least 125 h, most preferably of at least 150 h, determined according to ISO 1167-1:2006 at a hoop stress of 5.5 MPa and 80° C. The upper limit is usually not higher than 500 h.

Further, the pipe preferably has a pressure resistance of at least 350 h, more preferably of at least 400 h, still more preferably of at least 600 h, most preferably of at least 800 h, determined according to ISO 1167-1:2006 at a hoop stress of 5.3 MPa and 80° C. The upper limit is usually not higher than 2000 h.

Still further, the pipe preferably has a slow crack propagation resistance of at least 700 h, more preferably of at least 800 h, still more preferably of at least 900 h, and most preferably of at least 1000 h, determined in the Notched Pipe Test according to ISO 13479-2009 at a hoop stress of 4.6 MPa and 80° C. The upper limit is usually not higher than 5000 h.

Process

The polyethylene compositions of the present invention are usually made by a multi-stage process, i.e. a process which makes use of at least two reactors, one for producing a lower molecular weight component and a second for producing a higher molecular weight component. These reactors may be employed in parallel, in which case the components must be mixed after production. More commonly, the reactors are employed in series, such that the products of one reactor are used as the starting material in the next reactor, e.g. one component is formed in the first reactor and the second is formed in the second reactor in the presence of the first component. In this way, the two components are more intimately mixed, since one is formed in the presence of the other.

The polymerization reactions used in each stage may involve conventional ethylene homo-polymerization or copolymerization reactions, e.g. gas phase, slurry phase, liquid phase polymerizations, using conventional reactors, e.g. loop reactors, gas phase reactors, batch reactors, etc.

The polymerization may be carried out continuously or batchwise, preferably the polymerization is carried out continuously.

Known two-stage processes are for instance liquid phase-liquid phase processes, gas phase-gas phase processes and liquid phase-gas phase processes. It is also known that these two-stage processes can further be combined with one or more additional polymerization steps selected from gas phase, slurry phase or liquid phase polymerization processes.

Multimodal polyethylene compositions of the present invention are preferably produced in a multistage process, where lower molecular weight and higher molecular weight polymers (components) are produced in different polymerization steps, in any order.

A relatively low density (or high molecular weight (HMW) fraction) polymer can be prepared in the first polymerization step and the relatively high density (or low molecular weight (LMW) fraction) polymer in the second polymerization step. This can be referred to as the reverse mode. Alternatively, the low molecular weight polymer can be prepared in the first polymerization step and the high molecular weight polymer in the second polymerization step. This can be referred to as the normal mode and is preferred.

A two-stage process can, for example be a slurry-slurry or a gas phase-gas phase process, particularly preferably a slurry-gas phase process. Optionally the process according to the invention can comprise one or two additional polymerization steps.

These optional one or two additional polymerization steps preferably comprise gas phase polymerization steps.

The slurry and gas phase stages may be carried out using any conventional reactors known in the art. A slurry phase polymerization may, for example, be carried out in a continuously stirred tank reactor; a batch-wise operating stirred tank reactor or a loop reactor. Preferably slurry phase polymerization is carried out in a loop reactor. In such reactors the slurry is circulated with a high velocity along a closed pipe by using a circulation pump. Loop reactors are generally known in the art and examples are given, for instance, in U.S. Pat. Nos. 4,582,816, 3,405,109, 3,324,093, EP-A-479186 and U.S. Pat. No. 5,391,654.

The term gas phase reactor encompasses any mechanically mixed, fluidized bed reactor, fast fluidized bed reactor or settled bed reactor or gas phase reactors having two separate zones, for instance one fluidized bed combined with one settled bed zone. Preferably the gas phase reactor for the second polymerization step is a fluidized bed reactor.

The slurry and gas phase processes are well known and described in the prior art.

In a preferred embodiment of the invention the low molecular weight (LMW) component is produced first and the high molecular weight (HMW) component is produced in the presence of LMW component. In this case the LMW component is the first polyethylene component (A) and the HMW component is the second polyethylene component (B).

The polymerisation catalysts for the production of the base resin may include coordination catalysts of a transition metal, such as Ziegler-Natta (ZN), metallocenes, non-metallocenes, Cr-catalysts etc. The catalyst may be supported, e.g. with conventional supports including silica, Al-containing supports and magnesium dichloride based supports. Preferably the catalyst is a ZN catalyst, more preferably the catalyst is a non-silica supported ZN catalyst, and most preferably a $MgCl_2$-based ZN catalyst.

The Ziegler-Natta catalyst further preferably comprises a group 4 (group numbering according to new IUPAC system) metal compound, preferably titanium, magnesium dichloride and aluminum.

The catalyst may be commercially available or be produced in accordance or analogously to the literature. For the preparation of the preferable catalyst usable in the invention, reference is made to WO 2004/055068 and WO 2004/055069 of Borealis and EP 0 810 235. The content of these documents in its entirety is incorporated herein by reference, in particular concerning the general and all preferred embodiments of the catalysts described therein as well as the methods for the production of the catalysts. Particularly preferred Ziegler-Natta catalysts are described in EP 0 810 235.

The resulting end product consists of an intimate mixture of the polymers from the reactors, the different molecular-weight-distribution curves of these polymers together forming a molecular-weight-distribution curve having a broad maximum or several maxima, i.e. the end product is a multimodal polymer mixture.

It is preferred that the multimodal polyethylene composition according to the invention is a bimodal polyethylene mixture consisting of polymer components (A) and (B), optionally further comprising a small prepolymerisation fraction. It is also preferred that this bimodal polymer mixture has been produced by polymerisation as described above under different polymerisation conditions in two or more polymerisation reactors connected in series. Owing to the flexibility with respect to reaction conditions thus obtained, it is most preferred that the polymerisation is carried out in a loop reactor/a gas-phase reactor combination.

Preferably, the polymerisation conditions in the preferred two-stage method are so chosen that the comparatively low-molecular polymer having no content of comonomer is produced in one stage, preferably the first stage, owing to a high content of chain-transfer agent (hydrogen gas), whereas the high-molecular polymer having a content of comonomer is produced in another stage, preferably the second stage. The order of these stages may, however, be reversed.

In the preferred embodiment of the polymerisation in a loop reactor followed by a gas-phase reactor, the polymerisation temperature in the loop reactor preferably is 85 to 115° C., more preferably is 90 to 105° C., and most preferably is 92 to 100° C., and the temperature in the gas-phase reactor preferably is 70 to 105° C., more preferably is 75 to 100° C., and most preferably is 82 to 97° C. The pressure in the loop reactor is typically from 1 to 150 bar, preferably from 1 to 100 bar and the pressure in the gas phase reactor is typically at least 10 bar, preferably at least 15 bar but typically not more than 30 bar, preferably not more than 25 bar.

The polymerisation in the slurry phase reactor usually takes place in an inert diluent, typically a hydrocarbon diluent which is selected from a group comprising $C_3$ to $C_8$ hydrocarbons, such as methane, ethane, propane, n-butane, isobutane, hexanes such as n-hexane, heptanes, octanes etc. or their mixtures. Preferably the diluent is a low boiling hydrocarbon having from 1 to 4 carbon atoms or a mixture of such hydrocarbons. An especially preferred diluent is propane, possibly containing minor amounts of methane, ethane and/or butane. The inert diluent can be the same or different in the different polymerisation steps. The ethylene content in the fluid phase of the slurry in the slurry phase reactor may be from 0.5 to 50% by mole, preferably from 1 to 20% by mole, and in particular from 2 to 10% by mole.

In a preferred embodiment of a gas phase reactor, the polymerization takes place in a fluidised bed gas phase reactor where an olefin is polymerised in the presence of a polymerisation catalyst in an upwards moving gas stream. The reactor typically contains a fluidised bed comprising the growing polymer particles containing the active catalyst located above a fluidisation grid. The polymer bed is fluidised with the help of a fluidisation gas comprising the olefin monomer, eventually comonomer(s), eventually chain growth controllers or chain transfer agents, such as hydrogen, and eventually inert gas.

Also antistatic agent(s) may be introduced into the gas phase reactor if needed. Suitable antistatic agents and methods to use them are disclosed, amongst others, in U.S. Pat. Nos. 5,026,795, 4,803,251, 4,532,311, 4,855,370 and EP-A-560 035. They are usually polar compounds and include, amongst others, water, ketones, aldehydes alcohols.

The polymerization process may further comprise a pre-polymerisation step which precedes the polymerisation steps. The purpose of the pre-polymerisation is to polymerise a small amount of polymer onto the catalyst at a low temperature and/or a low monomer concentration. By pre-polymerisation it is possible to improve the performance of the catalyst in slurry and/or modify the properties of the final polymer. The pre-polymerisation step may be conducted in slurry or gas phase. Preferably the pre-polymerisation is conducted in slurry.

Thus, the pre-polymerisation step may be conducted in a loop reactor. The pre-polymerisation is then preferably conducted in an inert diluent, typically a hydrocarbon diluent such as methane, ethane, propane, n-butane, isobutane, pentanes, hexanes, heptanes, octanes etc., or their mixtures. Preferably the diluent is a low boiling hydrocarbon having from 1 to 4 carbon atoms or a mixture of such hydrocarbons. The most preferred diluent is propane.

The temperature in the pre-polymerisation step is typically from 0° C. to 90° C., preferably from 20° C. to 80° C. and more preferably from 40° C. to 70° C.

The pressure is not critical and is typically from 1 bar to 150 bar, preferably from 10 bar to 100 bar.

A chain-transfer agent, preferably hydrogen, is added as required to the reactors, and preferably 500 to 1200 moles of $H_2$/kmoles of ethylene are added to the reactor, when the LMW component is produced in this reactor, and 0 to 100 moles of $H_2$/kmoles of ethylene are added to the gas phase reactor when this reactor is producing the HMW component.

Optionally, additives or other polymer components can be added to the composition during the compounding step in the amount as described above. Preferably, the polyethylene composition of the invention obtained from the reactor is compounded in the extruder together with additives in a manner known in the art.

The composition of the invention, preferably if produced in a process comprising a compounding step, wherein the composition, i.e. the blend, which is typically obtained as a polyolefin base resin powder from the reactor, is extruded in an extruder and then pelletised to polymer pellets in a manner known in the art. The extruder may be e.g. any conventionally used extruder. As an example of an extruder for the present compounding step may be those supplied by Japan Steel works, Kobe Steel or Farrel-Pomini, e.g. JSW 460P or JSW CIM90P.

Use

Furthermore, the present invention relates to an article, preferably a pipe or pipe fitting and to the use of such a polyethylene composition for the production of an article, preferably a pipe or a moulded article, which is preferably a pipe fitting.

Production of a Moulded Article of the Invention:

The moulded article of the invention can be produced from the polyethylene composition according to the present invention using the methods and equipment known in the art. Thus, according to one preferred method the polyethylene composition is moulded, preferably injection moulded or blown moulded, more preferably injection moulded, in a conventional manner using conventional moulding equipment, to a shape of a desired article, preferably fitting for a pipe.

Production of Pipe of the Invention:

Pipes can be produced from the polyethylene composition according to the present invention according to the methods known in the art. Thus, according to one preferred method the polyethylene composition is extruded through an annular die to a desired internal diameter, after which the polyethylene composition is cooled.

The pipe extruder preferably operates at a relatively low temperature and therefore excessive heat build-up should be avoided. Extruders having a high length to diameter ratio L/D more than 15, preferably of at least 20 and in particular of at least 25 are preferred. The modern extruders typically have an L/D ratio of from about 30 to 35.

The polymer melt is extruded through an annular die, which may be arranged either as end-fed or side-fed configuration. The side-fed dies are often mounted with their axis parallel to that of the extruder, requiring a right-angle turn in the connection to the extruder. The advantage of side-fed dies is that the mandrel can be extended through the die and this allows, for instance, easy access for cooling water piping to the mandrel.

After the plastic melt leaves the die it is calibrated to the correct diameter. In one method the extrudate is directed into a metal tube (calibration sleeve). The inside of the extrudate is pressurised so that the plastic is pressed against the wall of the tube.

According to another method the extrudate leaving the die is directed into a tube having a perforated section in the centre. A slight vacuum is drawn through the perforation to hold the pipe against the walls of the sizing chamber.

After the sizing the pipe is cooled, typically in a water bath having a length of about 5 meters or more.

EXAMPLES

1. Definitions a) Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The $MFR_5$ of polyethylene is measured at a temperature of 190° C. and a load of 5 kg, the $MFR_2$ of polyethylene at a temperature of 190° C. and a load of 2.16 kg and the $MFR_{21}$ of polyethylene is measured at a temperature of 190° C. and a load of 21.6 kg. The quantity FRR (flow rate ratio) denotes the ratio of flow rates at different loads. Thus, $FRR_{21/5}$ denotes the value of $MFR_{21}/MFR_5$.

b) Density

Density of the polymer was measured according to ISO 1183-1:2004 Method A on compression moulded specimen prepared according to EN ISO 1872-2 (February 2007) and is given in kg/m³.

c) Comonomer Content

Quantitative nuclear-magnetic resonance (NMR) spectroscopy was used to quantify the comonomer content of the polymers.

Quantitative $^{13}C\{^1H\}$ NMR spectra recorded in the molten-state using a Bruker Advance III 500 NMR spectrometer operating at 500.13 and 125.76 MHz for $^1H$ and $^{13}C$, respectively. All spectra were recorded using a $^{13}C$ optimized 7 mm magic-angle spinning (MAS) probehead at 150° C. using nitrogen gas for all pneumatics. Approximately 200 mg of material was packed into a 7 mm outer diameter zirconia MAS rotor and spun at 4 kHz. This setup was chosen primarily for the high sensitivity needed for rapid identification and accurate quantification {[1], [2], [6]}. Standard single-pulse excitation was employed utilizing the transient NOE at short recycle delays of 3 s {[1], [3]} and the RSHEPT decoupling scheme {[4], [5]}. A total of 1024 (1 k) transients were acquired per spectrum. This setup was chosen due to its high sensitivity towards low comonomer contents.

Quantitative $^{13}C\{^1H\}$ NMR spectra were processed, integrated and quantitative properties determined using custom spectral analysis automation programs. All chemical shifts are internally referenced to the bulk methylene signal (δ+) at 30.00 ppm {[9]}.

Characteristic signals corresponding to the incorporation of 1-hexene were observed {[9]} and all contents calculated with respect to all other monomers present in the polymer.

$$H=I_{*B4}$$

With no other signals indicative of other comonomer sequences, i.e. consecutive comonomer incorporation, observed the total 1-hexene comonomer content was calculated based solely on the amount of isolated 1-hexene sequences:

$$H_{total}=H$$

Characteristic signals resulting from saturated end-groups were observed. The content of such saturated end-groups was quantified using the average of the integral of the signals at 22.84 and 32.23 ppm assigned to the 2 s and 3 s sites respectively:

$$S=(1/2)*(I_{2S}+I_{3S})$$

The relative content of ethylene was quantified using the integral of the bulk methylene (δ+) signals at 30.00 ppm:

$$E=(1/2)*I_{\delta+}$$

The total ethylene comonomer content was calculated based on the bulk methylene signals and accounting for ethylene units present in other observed comonomer sequences or end-groups:

$$E_{total}=E+(5/2)*B+(3/2)*S$$

The total mole fraction of 1-hexene in the polymer was then calculated as:

$$fH=(H_{total}/(E_{total}+H_{total}))$$

The total comonomer incorporation of 1-hexene in mole percent was calculated from the mole fraction in the usual manner:

$$H[mol\ \%]=100*fH$$

The total comonomer incorporation of 1-hexene in weight percent was calculated from the mole fraction in the standard manner:

$$H[wt\ \%]=100*(fH*84.16)/((fH*84.16)+((1-fH)*28.05))$$

[1] Klimke, K., Parkinson, M., Piel, C., Kaminsky, W., Spiess, H. W., Wilhelm, M., Macromol. Chem. Phys. 2006; 207:382.

[2] Parkinson, M., Klimke, K., Spiess, H. W., Wilhelm, M., Macromol. Chem. Phys. 2007; 208:2128.

[3] Pollard, M., Klimke, K., Graf, R., Spiess, H. W., Wilhelm, M., Sperber, O., Piel, C., Kaminsky, W., Macromolecules 2004; 37:813.

[4] Filip, X., Tripon, C., Filip, C., J. Mag. Reson. 2005, 176, 239.

[5] Griffin, J. M., Tripon, C., Samoson, A., Filip, C., and Brown, S. P., Mag. Res. in Chem. 2007, 45, S1, S198.

[6] Castignolles, P., Graf, R., Parkinson, M., Wilhelm, M., Gaborieau, M., Polymer 50 (2009) 2373.

[7] Zhou, Z., Muemmerle, R., Qiu, X., Redwine, D., Cong, R., Taha, A., Baugh, D. Winniford, B., J. Mag. Reson. 2007, 187, 225.

[8] Busico, V., Carbonniere, P., Cipullo, R., Pellecchia, R., Severn, J., Talarico, G., Macromol. Rapid Commun. 2007, 28, 1128.

[9] J. Randall, Macromol. Sci., Rev. Macromol. Chem. Phys. 1989, C29, 201.

d) Pressure Test on Notched Pipes (NPT); Slow Crack Propagation Resistance.

The slow crack propagation resistance is determined according to ISO 13479-2009 in terms of the number of hours the pipe withstands a certain pressure at a certain temperature before failure. The pressure test is carried out on notched SDR11 pipes having a outer diameter of 110 mm. A pressure of 9.2 bars and a temperature of 80° C. have been used. Notching is made with a climb milling cutter with a 60° included-angle V-cutter conforming to ISO 6108, having a cutting rate of 0.010±0.002 (mm/rev)/tooth. The used cutter has 24 teeth and the speed of the cutter is 680 rpm. The remaining ligament is 0.82-0.78 times the minimum wall thickness. The depth of the notch is calculated using equation below. h is the notch depth in mm. The four notches are equally placed in the pipe circumference. The length of the notch is 110±1 mm.

$$h = 0.5[d_{em} - \sqrt{(d_{em}^2 - b_s^2)}] + 0.866 b_s$$

where $b_s$ is the width of machined surface of the notch in mm;
$d_{em}$ is the measured mean pipe outside diameter in mm.

e) Pressure Test on Un-Notched Pipes (PT); Resistance to Internal Pressure

The resistance to internal pressure has been determined in a pressure test on pressure test on un-notched 32 mm SDR 11 pipes having a length of 450 mm is carried out in water-inside and water-outside environment according to ISO 1167-1:2006. End caps of type A were used. The time to failure is determined in hours. A hoop stress of 5.5 MPa at a temperature of 80° C. and at a hoop stress at 5.3 MPa tested at a temperature of 80° C. was applied.

f) Rapid Crack Propagation

The rapid crack propagation (RCP) resistance of a pipe is determined according to a method called the S4 test (Small Scale Steady State), which has been developed at Imperial College, London, and which is described in ISO 13477: 1997 (E). According to the RCP-S4 test a pipe is tested, which has an axial length not below 7 pipe diameters. The outer diameter of the pipe is about 110 mm or greater and its wall thickness about 10 mm or greater. When determining the RCP properties of a pipe in connection with the present invention, the outer diameter and the wall thickness have been selected to be 250 mm and 22.7 mm, respectively. While the exterior of the pipe is at ambient pressure (atmospheric pressure), the pipe is pressurised internally, and the temperature of the pipe is kept constant at a temperature of 0° C. The pipe and the equipment surrounding it are thermostatted to a predetermined temperature. A number of discs have been mounted on a shaft inside the pipe to prevent decompression during the tests. A knife projectile is shot, with well-defined forms, towards the pipe close to its one end in the so-called initiating zone in order to start a rapidly running axial crack. The initiating zone is provided with an abutment for avoiding unnecessary deformation of the pipe. The test equipment is adjusted in such a manner that crack initiation takes place in the material involved, and a number of tests are effected at varying temperatures. The axial crack length in the measuring zone, having a total length of 4.7 times the pipe diameter, is measured for each test and is plotted against the set test temperature. If the crack length exceeds 4.7 times the pipe diameter, the crack is assessed to propagate. If the pipe passes the test at a given pressure, the pressure is increased successively until a pressure is reached, at which the pipe no longer passes the test and the crack propagation exceeds 4.7 times the pipe diameter. The critical pressure ($p_{crit}$), i.e. the ductile brittle transition pressure as measured according to ISO 13477: 1997 (E) is the highest pressure at which the pipe passes the test. The higher the critical pressure ($p_c$) the better, since it results in an extension of the applicability of the pipe. In case the rapid crack propagation resistance of the composition is reported, a specimen as defined above has been prepared and the rapid crack propagation resistance determined thereon.

g) Charpy Notched Impact Strength

Charpy impact strength was determined according to ISO179/1eA:2000 on V-notched samples of 80*10*4 mm$^3$ at −20° C. (Charpy impact strength (−20° C.)). Samples were cut from plaques of 4 mm thickness prepared by compression molding according to ISO 293:2004 using the conditions defined in chapter 3.3 of ISO 1872-2:2007.

2. Examples a) Polymerization of Inventive Example IE1

A loop reactor having a volume of 50 dm$^3$ was operated at 60° C. and 65 bar pressure. For producing a prepolymer fraction 50 kg/h of propane diluent, 2 kg/h ethylene and 10 g/h of h of hydrogen were introduced into the reactor. In addition, commercially available Ziegler-Natta catalyst Lynx 200 polymerisation catalyst (BASF SE) was introduced into the reactor together with triethylaluminium cocatalyst so that the ratio of aluminium to titanium was 15 mol/mol. No comonomer was introduced into the reactor. The polymerisation rate was 1.9 kg/h and the conditions in the reactor as shown in Table 1.

The polymer slurry was withdrawn from the loop reactor and transferred into a loop reactor having a volume of 500 dm$^3$. This second loop reactor was operated at 95° C. and 65 bar pressure. Into the reactor were introduced 90 kg/h of propane diluent, ethylene and hydrogen whereby the molar hydrogen to ethylene ratio for example IE1 is listed in Table 1. The polymerisation rate was about 33 kg/h and the conditions in the reactor as shown in Table 1.

The polymer slurry was withdrawn from the second loop reactor and transferred into a flash vessel operated at 3 bar pressure and 70° C. temperature where the hydrocarbons were substantially removed from the polymer. The polymer was then introduced into a gas phase reactor operated at a temperature of 85° C. and a pressure of 20 bar. In addition ethylene, 1-hexene, nitrogen as inert gas and hydrogen was introduced into the reactor whereby the molar 1-hexene to ethylene ratio and the molar hydrogen to ethylene ratio as well as the production split, the melt flow rates and the density of the polymers of IE1 withdrawn from the gas phase reactor are listed in Table 1. The polymerisation rate was about 40 kg/h. The conditions are shown in Table 1.

The resulting polymer was purged with nitrogen (about 50 kg/h) for one hour, stabilised with 2200 ppm of Irganox B225 and 1500 ppm Ca-stearate and then extruded together with 3.0 wt % carbon black to pellets in a counter-rotating twin screw extruder CIM90P (manufactured by Japan Steel Works) The temperature profile in each zone was 90/120/190/250° C.

b) Comparative Examples CE1 and CE2

Comparative Examples CE1 to CE2 were polymerized using the same catalyst and cocatalyst components with a ratio of aluminium to titanium of 15 mol/mol and the same reactor configuration as Inventive Example IE1. The polymerization conditions and feeds to the different reactors are shown in Table 1. The resultant base resins of Comparative Examples CE1 and CE2 were treated and compounded as Inventive Example IE1.

c) Pipe Preparation

The compounded compositions of Inventive Example IE1 and Comparative Examples CE1 and CE2 were extruded to SDR 11 pipes for the pressure resistance tests and the Notched Pipe test.

For the Rapid Crack Propagation Test (S4) pipes with a diameter of 250 mm and a wall thickness of 22.7 mm were extruded.

The results of the pipe tests are shown in Table 2.

TABLE 1

| Polymerization conditions | | | |
|---|---|---|---|
| | CE1 | CE2 | IE1 |
| Prepolymerizer: | | | |
| Temperature [° C.] | 60 | 60 | 60 |
| Pressure [bar] | 65 | 65 | 65 |
| Production rate [kg/h] | 1.9 | 1.9 | 1.9 |
| Split [wt %] | 2.3 | 2.3 | 2.3 |
| Loop: | | | |
| Temperature [° C.] | 95 | 95 | 95 |
| Pressure [bar] | 65 | 65 | 65 |
| $H_2/C_2$ [mol/kmol] | 1100 | 1100 | 920 |
| $C_2$-concentration [mol %] | 2.6 | 2.5 | 2.7 |
| Production Rate [kg/h] | 35 | 33 | 33 |
| Split [wt %] includes prepoly | 47 | 45 | 45 |
| $MFR_2$ [g/10 min] | 325 | 325 | 200 |
| Gas phase: | | | |
| Temperature [° C.] | 85 | 85 | 85 |
| $H_2/C_2$ ratio [mol/kmol] | 57 | 64 | 56 |
| $C_6/C_2$ [mol/kmol] | 64 | 65 | 64 |
| $C_2$-concentration [mol %] | 15 | 16 | 17 |
| Production Rate [kg/h] | 40 | 40 | 40 |
| Split [wt %] | 53 | 55 | 55 |
| Density [kg/m³] | 949 | 949 | 949 |
| Composition Properties: | | | |
| Density [kg/m³] | 960 | 960 | 960 |
| $MFR_5$ [g/10 min] | 0.50 | 0.55 | 0.45 |
| $MFR_{21}$ [g/10 min] | 14 | 15 | 12 |
| $FRR_{21/5}$ | 28 | 27 | 27 |
| Charpy NIS (−20° C.) | 8.0 | 8.0 | 9.5 |

TABLE 2

| Pipe properties | | | |
|---|---|---|---|
| | CE1 | CE2 | IE1 |
| Pressure resist. (5.5 MPa) [h] | 28 | 35 | 160 |
| Pressure resist. (5.3 MPa) [h] | 330 | 233 | 863 |
| Notched Pipe Test (4.6 MPa) [h] | 650 | 693 | 1043 |
| $p_c$ (S4-Test) (0° C.) [bar] | ≥10 | n.d. | ≥10 |

The invention claimed is:

1. Polyethylene composition comprising
a base resin comprising
(A) a first ethylene homo- or copolymer component having a melt flow rate $MFR_2$ (2.16 kg, 190° C.) of equal to or more than 150 g/10 min to equal to or less than 300 g/10 min, determined according to ISO 1133, and
(B) a second ethylene homo- or copolymer component, optional carbon black,
optional further polymer component(s) different to the first ethylene homo- or copolymer components (A) and (B), and
optional additive(s);
wherein the first ethylene homo- or copolymer component (A) has a lower weight average molecular weight as the second ethylene homo- or copolymer component (B), and the weight ratio of the first ethylene homo- or copolymer component (A) to the second ethylene homo- or copolymer component (B) is from 40:60 to 47:53;
the polyethylene composition has a melt flow rate $MFR_5$ (5 kg, 190° C.) of equal to or more than 0.35 g/10 min to equal to or less than 0.60 g/10 min, determined according to ISO 1133; and
wherein the composition has a flow rate ratio, being the ratio of $MFR_{21}$ to $MFR_5$, of from 20 to 30.

2. The polyethylene composition according to claim 1, wherein the base resin has a density of equal to or more than 943 kg/m³ to equal to or less than 952 kg/m³, determined according to ISO 1183.

3. The polyethylene composition according to claim 1, wherein the first ethylene homo- or copolymer component (A) is an ethylene homopolymer.

4. The polyethylene composition according to claim 1, wherein the second ethylene homo- or copolymer component (B) is a copolymer of ethylene with one or more alpha-olefin comonomers having from 3 to 12 carbon atoms.

5. The polyethylene composition according to claim 1, wherein the composition has a melt flow rate $MFR_{21}$ (21.6 kg; 190° C.) of equal to or more than 8.0 g/10 min to equal to or less than 15.5 g/10 min, determined according to ISO 1133.

6. The polyethylene composition according to claim 1, wherein the composition comprises carbon black in an amount of 1.0 to 8.0 wt %.

7. The polyethylene composition according to claim 1, wherein the composition has a density of equal to or more than 955 to equal to or less than 965 kg/m³, determined according to ISO 1183.

8. The polyethylene composition according to claim 1, wherein the composition comprises:
a base resin consisting of
(A) a first ethylene homo- or copolymer component having a melt flow rate $MFR_2$ (2.16 kg, 190° C.) of equal to or more than 150 g/10 min to equal to or less than 300 g/10 min, determined according to ISO 1133,
(B) a second ethylene homo- or copolymer component, and an ethylene prepolymer component;
carbon black; and
optional additives;
wherein the first ethylene homo- or copolymer component (A) has a lower weight average molecular weight as the second ethylene homo- or copolymer component (B), and the weight ratio of the first ethylene homo- or copolymer component (A) including the ethylene prepolymer component to the second ethylene homo- or copolymer component (B) is from 40:60 to 47:53;
the polyethylene composition has a melt flow rate $MFR_5$ (5 kg, 190° C.) of equal to or more than 0.35 g/10 min to equal to or less than 0.60 g/10 min, determined according to ISO 1133.

9. A polyethylene composition obtainable by a multistage process, the process comprising a) polymerizing ethylene in the presence of a Ziegler-Natta catalyst for obtaining an intermediate material, the intermediate material having a melt flow rate $MFR_2$ (2.16 kg, 190° C.) of equal to or more than 150 g/10 min to equal to or less than 300 g/10 min, determined according to ISO 1133, b) transferring the intermediate material to a gas phase reactor (i) feeding ethylene and at least one alpha-olefin comonomer having from 3 to 12 carbon atoms to the gas phase reactor (ii) further polymerizing the intermediate material to obtain a base resin which comprises the intermediate material in an amount of 40 to 47 wt % of the base resin, c) extruding the base resin, optionally in the presence of carbon black and/or further additive(s), into a polyethylene composition having a melt flow rate $MFR_5$ (5 kg, 190° C.) of equal to or more than 0.35 g/10 min to equal to or less than 0.60 g/10 min, determined according to ISO 1133;

wherein the composition has a flow rate ratio, being the ratio of $MFR_{21}$ to $MFR_5$, of from 20 to 30.

10. An article comprising the polyethylene composition according to claim 1.

11. The article according to claim 10 being a pipe or pipe fitting.

12. The article according to claim 11, wherein the pipe has a pressure resistance of at least 50 h, determined according to ISO 1167-1:2006 at a hoop stress of 5.5 MPa and 80° C.

13. The article according to claim 11, wherein the pipe has a pressure resistance of at least 350 h, determined according to ISO 1167-1:2006 at a hoop stress of 5.3 MPa and 80° C.

14. The article according to claim 10, wherein the pipe has a slow crack propagation resistance of at least 700 h, determined in the Notched Pipe Test according to ISO 13479-2009 at a hoop stress of 4.6 MPa and 80° C.

15. An article comprising the polyethylene composition according to claim 9.

16. The polyethylene composition according to claim 1, having a Charpy notched impact strength, determined according to ISO 179eA at a temperature of −20° C., of more than 8.0 kJ/m³.

17. A polyethylene composition consisting of
a base resin consisting of
(A) a first ethylene homopolymer component having a melt flow rate $MFR_2$(2.16 kg, 190° C.) of equal to or more than 170 g/10 min to equal to or less than 230 g/10 min, determined according to ISO 1133,
(B) a second ethylene copolymer component, being a copolymer of ethylene and 1-hexene, and
an ethylene homopolymer prepolymer component;
carbon black; and
optional additives;
wherein the first ethylene homopolymer component (A) has a lower weight average molecular weight than the second ethylene copolymer component (B), and the weight ratio of the first ethylene homopolymer component (A) including the ethylene prepolymer component to the second ethylene copolymer component (B) is from 42:68 to 46:54;
the polyethylene composition has a melt flow rate $MFR_5$ (5 kg, 190° C.) of equal to or more than 0.42 g/10 min to equal to or less than 0.57 g/10 min, determined according to ISO 1133,
wherein the composition has a flow rate ratio, being the ratio of $MFR_{21}$ to $MFR_5$, of from 23 to 28.

18. The polyethylene composition according to claim 17, wherein the base resin has a density of equal to or more than 946 kg/m³ to equal to or less than 950 kg/m³.

19. The polyethylene composition according to claim 17, wherein the base resin has a hexene content of 0.45 mol % to 1.5 mol %.

20. The polyethylene composition according to claim 17, wherein the composition has a $MFR_{21}$ (21.6 kg, 190° C.) of equal to or more than 11.0 g/10 min to equal to or less than 13.0 g/10 min, determined according to ISO 1133.

21. The polyethylene composition according to claim 1 having a Charpy notched impact strength, determined according to ISO 179eA at a temperature of −20° C. of at least 9.3 kJ/m³.

* * * * *